(12) United States Patent
Lau et al.

(10) Patent No.: US 9,001,795 B2
(45) Date of Patent: Apr. 7, 2015

(54) POWER CONTROL LOOP FOR A CDMA SYSTEM

(75) Inventors: Katrina Lau, New South Wales (AU); Graham C. Goodwin, Newcastle (AU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 279 days.

(21) Appl. No.: 13/574,147

(22) PCT Filed: Jun. 30, 2010

(86) PCT No.: PCT/SE2010/050752
§ 371 (c)(1),
(2), (4) Date: Aug. 21, 2012

(87) PCT Pub. No.: WO2011/093760
PCT Pub. Date: Aug. 4, 2011

(65) Prior Publication Data
US 2012/0314691 A1    Dec. 13, 2012

Related U.S. Application Data

(60) Provisional application No. 61/298,327, filed on Jan. 26, 2010.

(51) Int. Cl.
*H04W 52/24* (2009.01)
*H04W 52/12* (2009.01)

(52) U.S. Cl.
CPC ............ *H04W 52/12* (2013.01); *H04W 52/241* (2013.01)

(58) Field of Classification Search
CPC ..................................................... H04W 52/24
See application file for complete search history.

(56) References Cited

U.S. PATENT DOCUMENTS

| | | | |
|---|---|---|---|
| 2003/0003939 A1* | 1/2003 | Banerjee | ........................ 455/522 |
| 2004/0209636 A1 | 10/2004 | Chen et al. | |
| 2009/0190485 A1 | 7/2009 | Bjorkegren et al. | |
| 2011/0009156 A1* | 1/2011 | Goodwin et al. | ............. 455/522 |

OTHER PUBLICATIONS

Aguero, J. C. et al. "Three-Degree of Freedom Adaptive Power Control for CDMA Cellular Systems." IEEE Global Telecommunications Conference, 2009 (GLOBECOM 2009) Nov. 30-Dec. 4, 2009, pp. 1-6.
Gunnarsson, F. "Fundamental Limitations of Power Control in WCDMA." IEEE VTS 54th Vehicular Technology Conference, vol. 2, Fall 2001, pp. 630-634.

* cited by examiner

*Primary Examiner* — Sulaiman Nooristany
(74) *Attorney, Agent, or Firm* — Murphy, Bilak & Homiller, PLLC (57) ABSTRACT

In a method and a device improved power control for the inner loop of a CDMA system is provided. A model for the power coupling caused by the SIR target inner loop is provided. Hereby a decoupling function for the power coupling caused by the SIR target inner loop can be provided and used when controlling the power in the inner loop.

9 Claims, 11 Drawing Sheets

POWER CONTROL LOOP FOR A CDMA SYSTEM

TECHNICAL FIELD

The present invention relates to a method and a device for power control in a radio system.

BACKGROUND

The uplink of code division multiple access (CDMA) systems, in particular in the wideband code division multiple access (WCDMA) system uses a fast inner power control loop to control transmission power. In these systems users transmit a signal spread in the same (wide) frequency band, thereby causing interference for the other users transmitting in the same band.

The services carried over these systems typically require a certain signal to interference ratio (SIR), to maintain a stipulated quality of service (QoS). The fast inner power control loop therefore strives to maintain a target SIR, in order to secure the above QoS goal. The target SIR is set by a much slower outer power control loop that typically uses the observed block error rate for adjustment. The inner power control loop for CDMA systems is further described in Aguero J C, Goodwin G C, Lau K, Wang M, Silva E I, Wigren T, 'Three-degree of freedom adaptive power control for CDMA cellular systems', *GLOBECOM* 2009: 2009 *IEEE Global Telecommunications Conference*, Honolulu, Hi. (2009).

A first significant problem in existing systems is that quite large variations of the load of the uplink can occur, in particular when the uplink is operated closely to what is feasible. This is undesirable, e.g. since it creates interference for neighbor cells and may reduce the battery life of the mobile stations, also termed user equipments (UEs), transmitting in the uplink.

A second significant problem is that existing system can show slow convergence after an interference change. This is shown below by simulations. The effect of this slow convergence can be a reduced QoS of the services served by the cell.

Hence, there exists a need to reduce the above problems and to provide an improve control method and device for controlling power in the inner power control loop of a CDMA system.

SUMMARY

It is an object of the present invention to provide improved methods and devices to address the problems as outlined above.

This object and others are obtained by the methods and devices as described herein and set out in the attached independent claims. Advantageous embodiments are set out in the attached dependent claims.

Thus, in accordance with the present invention, a power control method for the inner loop of a CDMA system, in particular a WCDMA system is provided. The method comprises the steps of determining a model for the power coupling caused by the SIR target inner loop, providing a decoupling function for the power coupling caused by the SIR target inner loop, and repeatedly calculating the decoupling function, which decoupling function is then used when controlling the power in the inner loop.

In accordance with one embodiment the decoupling function is obtained by providing a linearized model of the decoupling function. In particular the inner loop power control can be configured to employ the following steps when controlling the power:

Determination of a nonlinear model for the power coupling caused by the SIR target inner loop control method.

Linearization of said model around the current operating point.

Design of a decoupling matrix from said linearized model.

Repeated calculation of said decoupling matrix in a multiple input-multiple output inner loop power control procedure, said procedure being adapted to provide decoupling between different users of the CDMA uplink.

In accordance with one embodiment a non-linear model is used to obtain the decoupling function. In particular the inner loop power control can be configured to employ the following steps when controlling the power:

Determination of a nonlinear model for the power coupling caused by the SIR target inner loop control method.

Design of a nonlinear decoupling function from said nonlinear model.

Repeated calculation of said decoupling function in novel multiple input-multiple output inner loop power control method, the method being adapted to provide decoupling between different users of the (W)CDMA uplink.

The invention also extends to a device adapted to perform power control in accordance with the above. The device can typically be implemented in a module comprising a micro controller or a micro processor operating on a set of computer program instructions stored in a memory, which instructions when executed by the module causes the module to perform power control in accordance with the method as described above.

BRIEF DESCRIPTION OF THE DRAWINGS

The present invention will now be described in more detail by way of non-limiting examples with reference to the accompanying drawings, in which.

DETAILED DESCRIPTION

In the following description, for purposes of explanation and not limitation, specific details are set forth such as particular architectures, interfaces, techniques, etc. However, it will be apparent to those skilled in the art that the described technology may be practiced in other embodiments that depart from these specific details. That is, those skilled in the art will be able to devise various arrangements which, although not explicitly described or shown herein, embody the principles of the described technology. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional may be provided through the use of dedicated hardware as well as hardware capable of executing software. When a computer processor is used, the functions may be provided by a single dedicated processor, by a single shared processor, or by a plurality of individual processors, some of which may be shared or distributed. Moreover, a controller as described herein may include, without limitation, digital signal processor (DSP) hardware, ASIC hardware, read only memory (ROM), random access memory (RAM), and/or other storage media.

Figure 1:
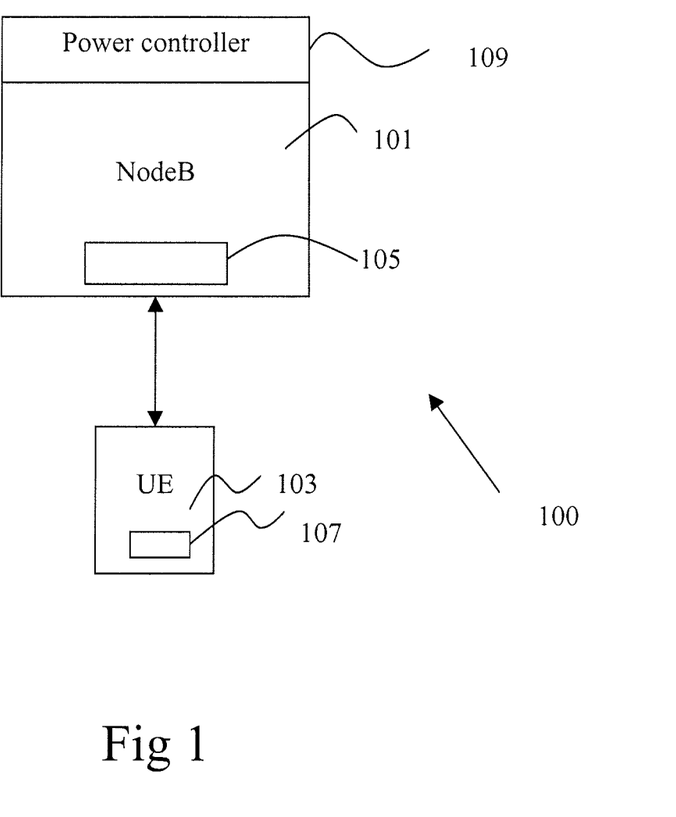
FIG. 1 is a general view of a CDMA radio system.

In FIG. 1 a general view of a cellular radio system 100 is depicted. The system can for example be a WCDMA system, but the below description can be applied to any CDMA system. The system comprises a number of radio base stations 101, here denoted NodeBs. A mobile station 103, here denoted User Equipment UE, that is in a geographical area covered by the radio base station can connect to the radio base station over an air-interface. The base station 101 and the mobile station 103 can further comprise modules, here generally denoted 105 and 107, respectively for performing different tasks performed with these entities. The base station 101 further comprises a power control module 109. The power control module can be arranged to control the power in the uplink for the mobile station in accordance with any of the control methods described herein. The module 109 can for example be implemented using a microcontroller operating on a set of computer software instructions stored on a memory in the module 109. The functions of the various modules comprising components such as processors or controllers can be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a processor or controller may include, without limitation, digital signal processor (DSP) hardware, ASIC hardware, read only memory (ROM), random access memory (RAM), and/or other storage media.

Other configurations of the radio base station are also envisaged. For example the functions provided by the radio base station can be distributed to other modules or than the modules 105 and 109.

As has been realized due to the fact that the inner power control loops strive to maintain each respective SIR target, all power control loops become non-linearly coupled. This non-linear coupling can be explained as follows. In response to any interference increase experienced by a user, the transmit power of the UE is increased to maintain the SIR—this increase is commanded by the radio base station. This in turn increases the interference for the other users who respond by increasing their power and so on. If the uplink power control problem is feasible, the powers of all users will settle at a new level, where the SIRs are met. If the problem is not feasibly, the cell will go unstable, causing major disruption of ongoing connections.

Figure 15:
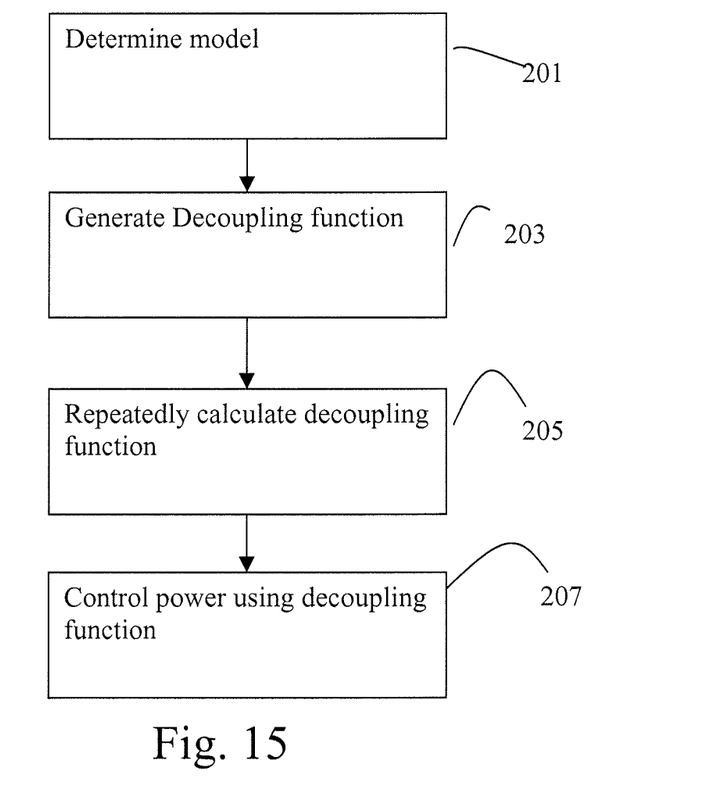
FIG. 15 is a flowchart illustrating some procedural steps performed in a power control module when using a decoupling function.

In FIG. 15 a flowchart illustrating some procedural steps performed in a power control module 109 when using a decoupling function is illustrated. First in a step 201, a model for the power coupling caused by the SIR target inner loop of the control system is determined. Next, in a step 203, a decoupling function for the power coupling caused by the SIR target inner loop is provided. Then, in a step 205 the decoupling function is repeatedly calculated. The power of the inner loop is then controlled using the decoupling function, in a step 207.

Thus, in accordance with the invention the non-linear coupling of the inner loops of different mobile stations are taken into account when controlling the power in the inner loop of a particular mobile station. The function used to base the non-linear coupling on can be a linearization around a current operating point or a non-linear function. Different exemplary implementations of the decoupling function to be used when controlling the power in the inner loop will now be described more in detail using terminology from a WCDMA system.

Inner Loop Power Control in WCDMA

Figure 2:
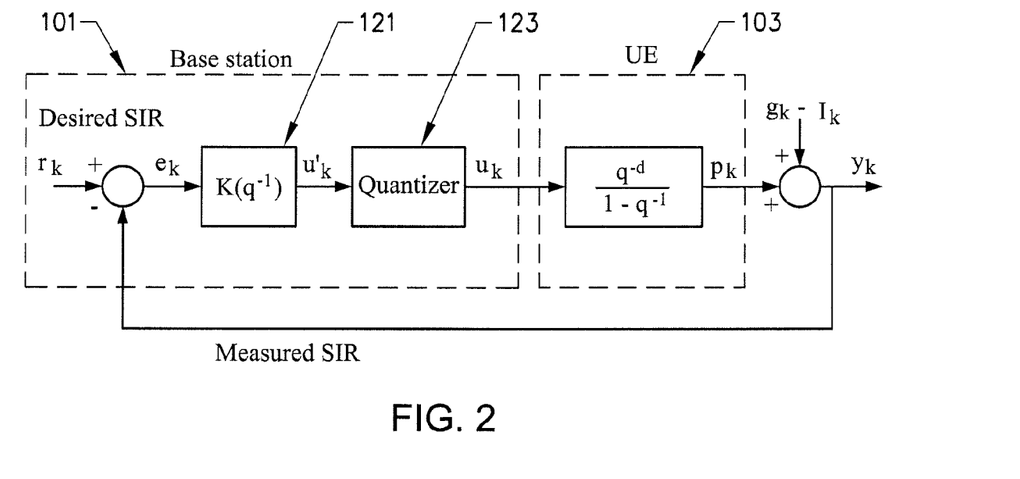
FIG. 2 is a simplified exemplary block diagram of one inner power control loop of the WCDMA uplink.

A simplified exemplary block diagram of a conventional inner power control loop of the WCDMA uplink appears in FIG. 2. FIG. 2 depicts a control model of the inner power control loop including a base station 101 and a mobile station 103. The base station comprises a quantizer block 123.

Further, note that the quantities are expressed in a logarithmic scale ([dB]). Here $q^{-1}$ denotes the backward shift operator, k discrete time ([slot, 667 micro seconds]), $r_k$ the target SIR, $e_k$ the SIR error, $K(q^-)$ the controller 121 (a constant in the current implementation), $u_k'$ the control signal, $u_k$ the one-bit quantized transmitted control signal, d the delay in slots, $p_k$ the transmit power from the mobile station, $g_k$ the uplink channel gain, $I_k$ the interference and $y_k$ the measured SIR. The inner loop power controller typically operates at a frequency of 1500 Hz.

Problems with Existing Solutions

Non-Dynamic $K(q^{-1})$

The first problem with the controller of the above control loop is that the delay d is normally greater than 1 slot, typically 2-3 slots. In such situations it can be shown that the optimal controller aiming to minimize the variance is not a constant-rather it depends on more than the current control signal and control error.

Coupling Problem

The second problem with the above control loop is that it is designed based on the assumption that the other users can be treated essentially as noise sources, thereby neglecting that there is a non-linear coupling between different control loops for different users in the uplink. This leads to reduced performance, as compared to the situation where non-linear coupling is accounted for.

Slow Convergence

The third problem of the above control loop is a consequence of the second problem. It manifests itself in terms of a slow convergence to new power levels, after an interference disturbance. This is illustrated in a two user case in FIG. 8.

In order to simplify the notation, the following examples are given in a two user scenario. The generalization to an arbitrary number of users is straightforward.

Delay Compensation with Linearized Decoupling

Let $p_i$ denote the received uplink powers [dB] from user i, at some time k and define $p=(p_1\ p_2)^T$. Define the vectors S (SIR) I (interference) and u (inner loop power command) in the same way. Linear quantities are denoted by bars, whereas corresponding logarithmic quantities are denoted without a bar.

Standard considerations of the inner loop power control loop for the two users then reveal that the following sequence of equations describes the coupling between them $$\bar{p}_i = 10^{0.1 p_i} \quad (1)$$

$$\bar{I} = \begin{pmatrix} \bar{\alpha}(1+\bar{\gamma}_1) & 1+\bar{\gamma}_2 \\ 1+\bar{\gamma}_1 & \bar{\alpha}(1+\bar{\gamma}_2) \end{pmatrix}\bar{p} + \begin{pmatrix} \bar{N}_0 \\ \bar{N}_0 \end{pmatrix} \quad (2)$$

$$I_i = 10 * \log_{10}(\bar{I}_i) \quad (3)$$

$$S = p - I. \quad (4)$$

Figure 3:
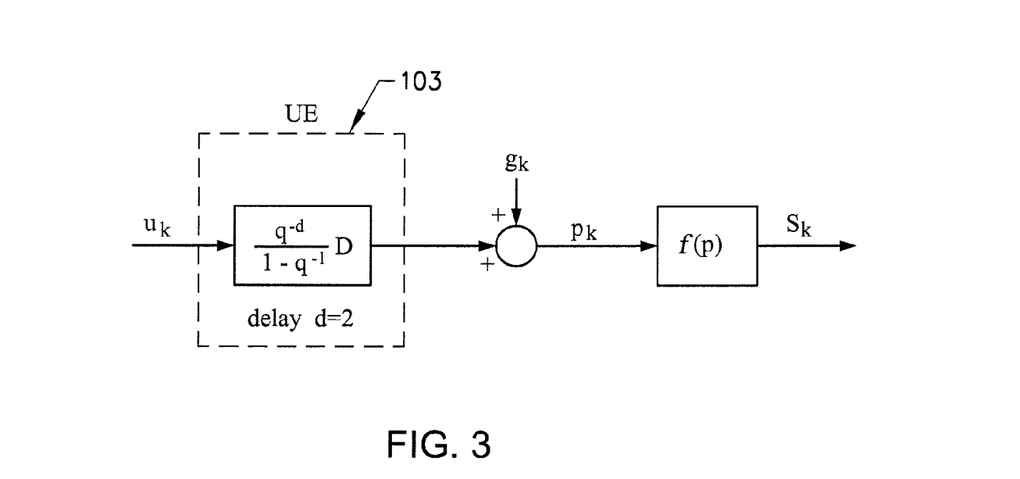
FIG. 3 is a view of a general model modeling the multi input multi output relation from u to S.

Here $\bar{\gamma}_i$ is the scale factor of the data channel (derived from the beta factors), and $\bar{\alpha}$ denotes the self interference factor. $N_0$ is the thermal noise. Let $S=f(p)$ denote the nonlinear mapping from p to S. FIG. 3 depicts a MIMO system from u to S, where D is the 2×2 identity matrix. The multi input multi output relation from u to S can be modeled as in FIG. 3, with $$\hat{f}_1(p_1,p_2)=p_1-10\log_{10}(\bar{\alpha}(1+\bar{\gamma}_1)\bar{p}_1+(1+\bar{\gamma}_2)\bar{p}_2+\bar{N}_0)$$

$$\hat{f}_2(p_1,p_2)=p_2-10\log_{10}((1+\bar{\gamma}_1)\bar{p}_1+\bar{\alpha}(1+\bar{\gamma}_2)\bar{p}_2+\bar{N}_0) \quad (5)$$

Let S* be the target SIR vector. Then the target steady state power vector p* follow from $$S^*\begin{pmatrix} 1 \\ 1 \end{pmatrix} = \hat{f}(p^*). \quad (6)$$

This relation can be linearized around the steady state operating point to give $$S \approx S^* + M(p^*)(p-p^*) \quad (7)$$

-continued $$M(p^*) = \begin{pmatrix} \frac{\partial f_1}{\partial p_1} & \frac{\partial f_1}{\partial p_2} \\ \frac{\partial f_2}{\partial p_1} & \frac{\partial f_2}{\partial p_2} \end{pmatrix}\bigg|_{p=p^*}.$$

Decoupled Inner Loop Power Control Schemes

In accordance with this exemplary embodiment, a linearization is used around the current power operating (vector) point, to approximately decouple the power control loops of the different users. The benefits are that Inner power control loops (based on SIR target) will operate better—since the original design is made without consideration of the nonlinear coupling in the uplink.

The convergence time to a new setpoint after an interference disturbance becomes significantly reduced, provided that the power command quantization is low enough.

The SIR based power control principle is retained, something that allows the improvements associated with the invention to be obtained without switching to a completely redesigned scheme based on a power target.

As a result the performance and QoS of the system is enhanced, without requiring a re-design.

Figure 4:
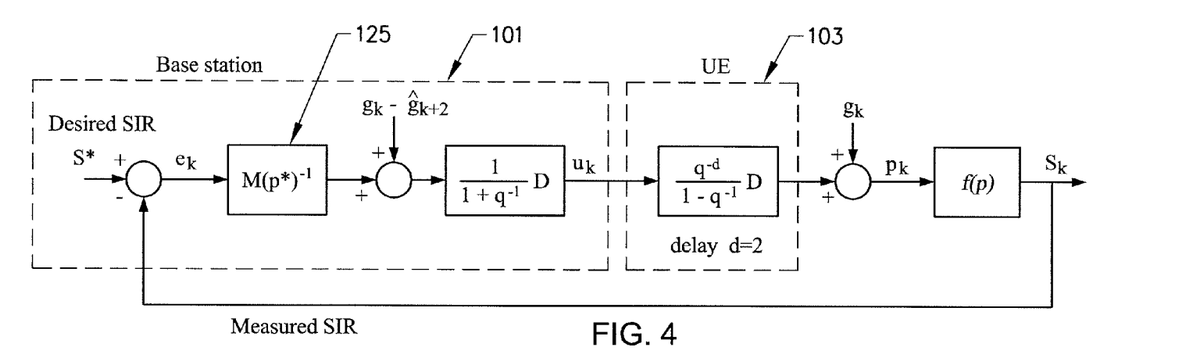
FIGS. 4 and 5 depict two alternative embodiments of a controller using linearized decoupled Multiple Input Multiple Output (MIMO) inner power control loops.
Figure 5:
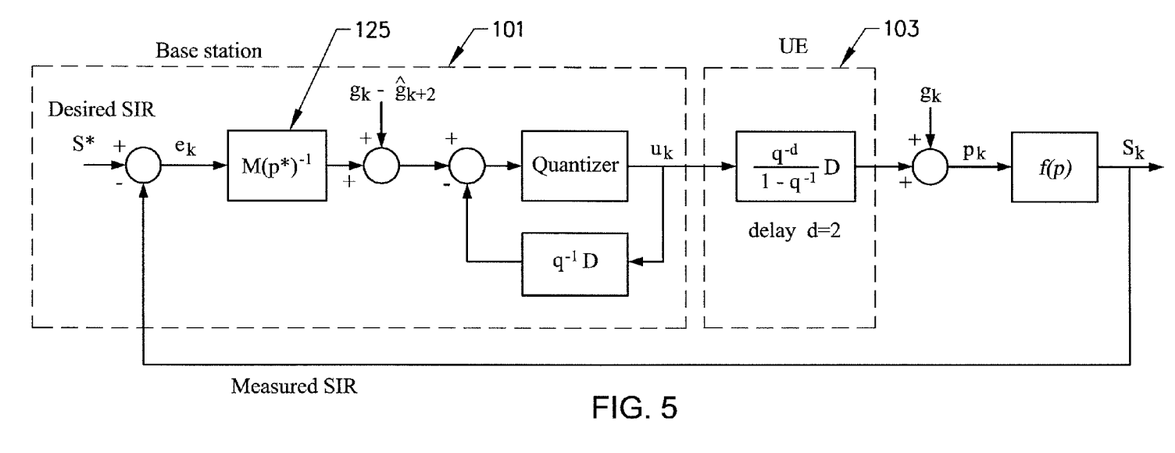

In FIGS. 4 and 5 two alternative embodiments of a controller using linearized decoupled Multiple Input Multiple Output (MIMO) inner power control loops in accordance with the above are depicted where the controller 125 using a linearized decoupling matrix takes into account the coupling in the uplink.

Thus, a linearized decoupling matrix M(p*), is applied to the MIMO inner loop power control method in CDMA systems. The reference value is provided by a target SIR that can be provided by the outer power control loop.

Decoupling Matrix

In order to show how the calculation of the decoupling matrix can be performed, note that $S^*=\hat{f}_1(p_1^*, p_2^*)$ (cf. (6)), results in $$\bar{S}^* = \frac{\bar{p}_1^*}{\bar{\alpha}(1+\bar{\gamma}_1)\bar{p}_1^* + (1+\bar{\gamma}_2)\bar{p}_2^* + \bar{N}_0} \quad (8)$$

Straightforward differentiation and utilization of (5) then results in $$M(p^*) = \begin{pmatrix} 1 - \frac{\bar{\alpha}(1+\bar{\gamma}_1)}{64} & -\frac{(1+\bar{\gamma}_2)}{64}\frac{\bar{p}_2^*}{\bar{p}_1^*} \\ -\frac{(1+\bar{\gamma}_1)}{64}\frac{\bar{p}_1^*}{\bar{p}_2^*} & 1 - \frac{\bar{\alpha}(1+\bar{\gamma}_2)}{64} \end{pmatrix}, \quad (9)$$

which is valid in the common case where $S^*=1/64$.

Figure 16:
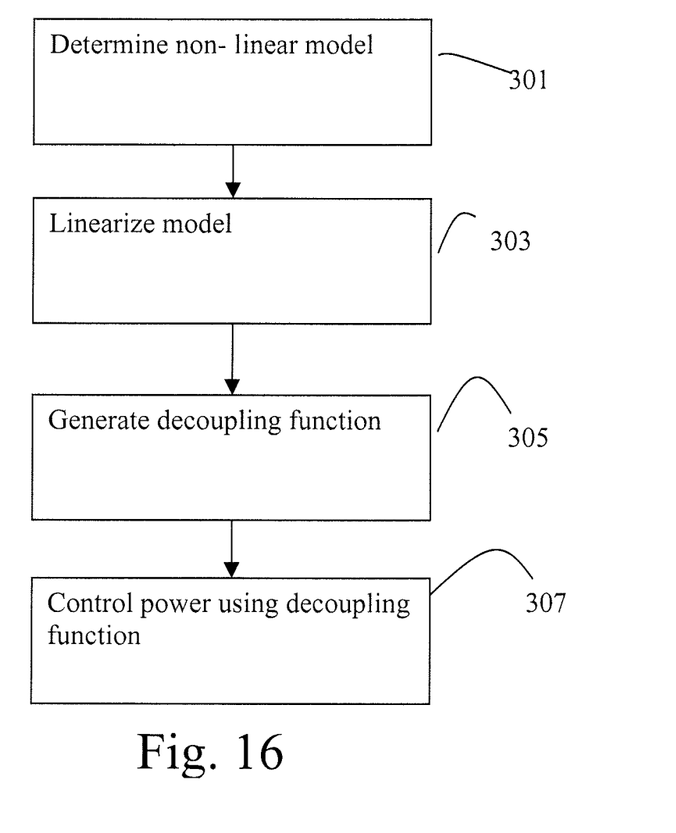
FIG. 16 is a flowchart illustrating some procedural steps performed in a power control module 109 when using a linearized decoupling function.

In FIG. 16 a flowchart illustrating some procedural steps performed in a power control module 109 when using a linearized decoupling function is illustrated. First, in a step 301, a nonlinear model for the power coupling caused by the SIR target inner loop is determined. The model can for example be a model as described above. Next, in a step 303, the determined model is linearized around the current operating point. Thereupon a decoupling matrix is formed from said linearized model in a step 305. Then power control in the inner loop is performed using the decoupling to provide decoupling between different users of a (W)CDMA uplink in a step 307. In one embodiment the power control comprises repeated calculation of the decoupling matrix in a multiple input—multiple output inner loop power control procedure.

Simulation Results

Figure 8:
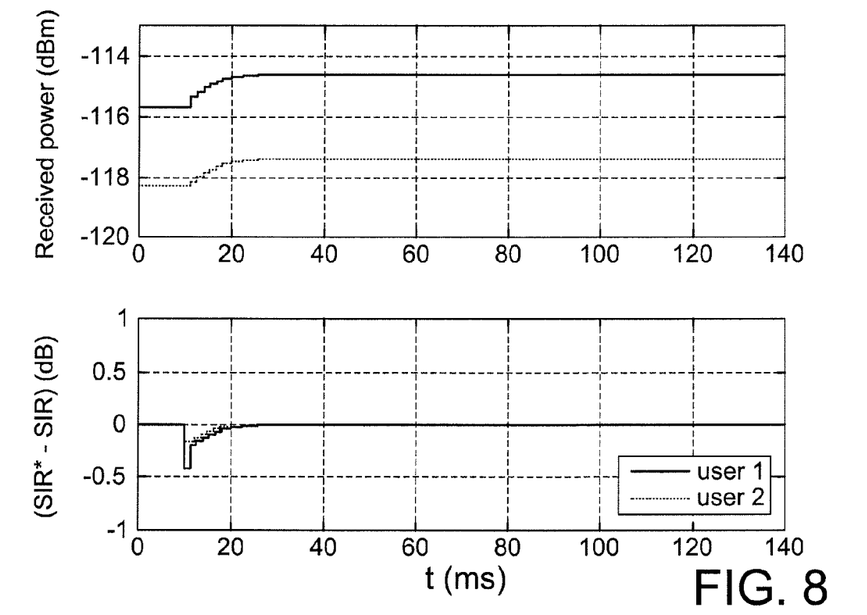
FIG. 8 illustrates slow convergence of powers and SIRs of a conventional inner loop power control scheme (quantization effect not shown)
Figure 9:
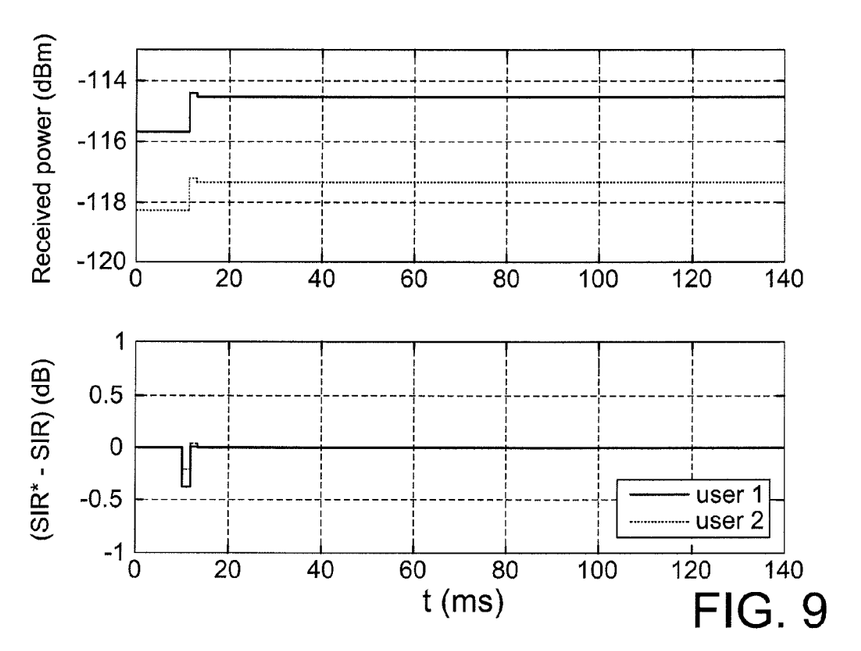
FIG. 9 illustrates convergence of powers and SIRs of a inner loop power control scheme using a linearized decoupling function (quantization effect not shown)

In order to illustrate some advantages of the above method and device for power control, the same setup that generated FIG. 8 was used to simulate the inner loop power control, using the controller of FIG. 4. The result, which appears in FIG. 9, shows a vastly improved convergence time. Note that no quantization was used in this case.

Figure 10:
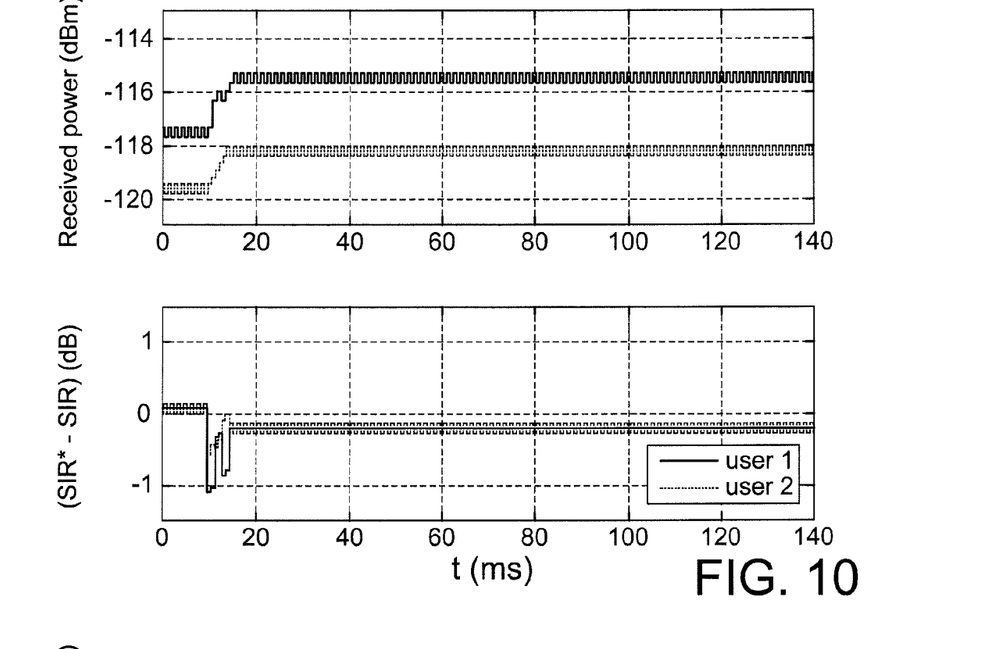
FIG. 10 depicts simulation results using a conventional controller with a 3 bit quantizer (not using decoupling)
Figure 11:
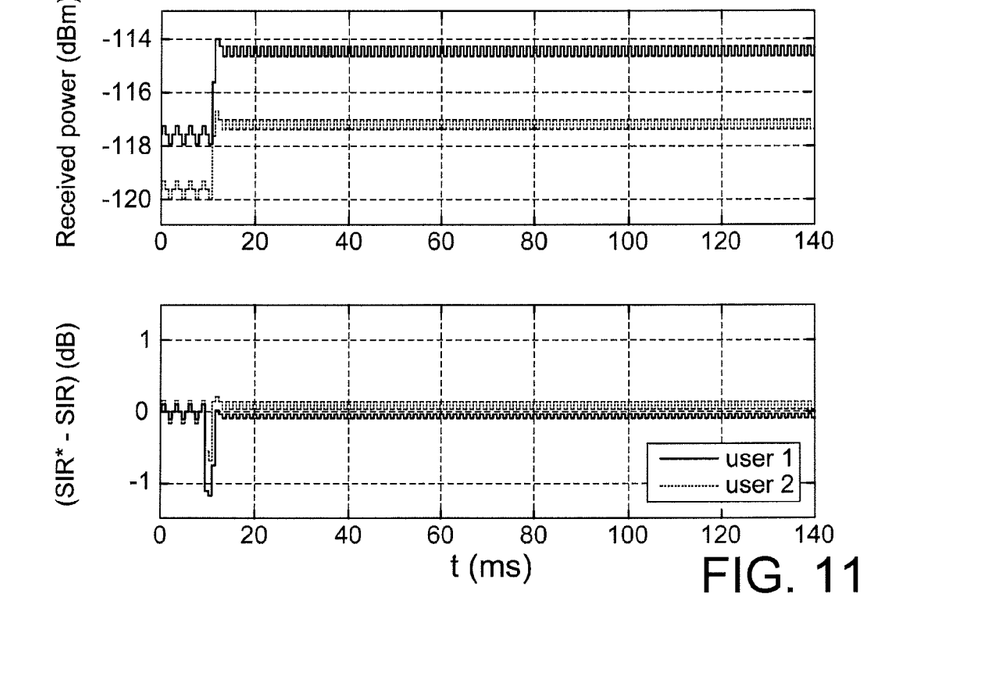
FIG. 11 depicts simulation results with a controller with a 3 bit quantizer using linearized decoupling.

When quantization is added the gains are reduced. However, substantial gains remain with a 3-bit quantizer. This is depicted in FIGS. 10 and 11. FIG. 10 depicts simulation results using a conventional controller with a 3 bit quantizer not using decoupling. In contrast the simulation results with a controller with a 3 bit quantizer using linearized decoupling is depicted in FIG. 11.

Delay Compensation with Nonlinear Decoupling

Let $p_i$ denote the received uplink powers [dB] from user i, at some time k and define $p=(p_1\ p_2)^T$. Define the vectors S (SIR), I (interference), and u (inner loop power command) in the same way. Linear quantities are denoted by bars, whereas corresponding logarithmic quantities are denoted without a bar.

Standard considerations of the inner loop power control loop for the two users then reveal that the following sequence of equations describe the coupling between them $$\bar{p}_i = 10^{0.1 p_i} \quad (11)$$

$$\bar{I} = A\bar{p} + b \quad (12)$$

$$I_i = 10 * \log_{10}(\bar{I}_i) \quad (13)$$

$$S = p - I. \quad (14)$$

Here $$A = \begin{pmatrix} \bar{\alpha}(1+\bar{\gamma}_1) & 1+\bar{\gamma}_2 \\ 1+\bar{\gamma}_1 & \bar{\alpha}(1+\bar{\gamma}_2) \end{pmatrix} \text{ and } b = \begin{pmatrix} \bar{N}_0 \\ \bar{N}_0 \end{pmatrix}.$$

Further $\bar{\gamma}_i$ is the scale factor of the data channel (derived from the beta factors), and $\bar{\alpha}$ denotes the self interference factor. $N_0$ is the thermal noise. Let $S = f(p)$ denote the nonlinear mapping from p to S. Then the multi input multi output relation from u to S can be modeled as in FIG. 3, with $$\hat{f}_1(p_1,p_2) = p_1 - 10\log_{10}(\bar{\alpha}(1+\bar{\gamma}_1)\bar{p}_1 + 1(1+\bar{\gamma}_2)\bar{p}_2 + \bar{N}_0)$$

$$\hat{f}_2(p_1,p_2) = p_2 - 10\log_{10}((1+\bar{\gamma}_1)\bar{p}_1 + \bar{\alpha}(1+\bar{\gamma}_2)\bar{p}_2 + \bar{N}_0) \quad (15)$$

As above FIG. 3 depicts a MIMO system from u to S, where D is the 2×2 identity matrix.

Next let $$\bar{S}_D = \begin{bmatrix} \bar{S}_1 & 0 \\ 0 & \bar{S}_2 \end{bmatrix} \quad (16)$$

A decoupling link counteracting the coupling of (15) can be obtained by estimation of the inverse function $\hat{f}^{-1}(S) = \hat{p}$, where $$\bar{S}_i = 10^{0.1 S_i} \quad (17)$$

$$\hat{p} = \left(\begin{bmatrix} 1 & 0 \\ 0 & 1 \end{bmatrix} - \bar{S}_D \hat{A}\right)^{-1} \bar{S}_D \hat{b} \quad (18)$$

$$\hat{p}_i = 10\log_{10} \hat{\bar{p}}_i \quad (19)$$

Figure 6:
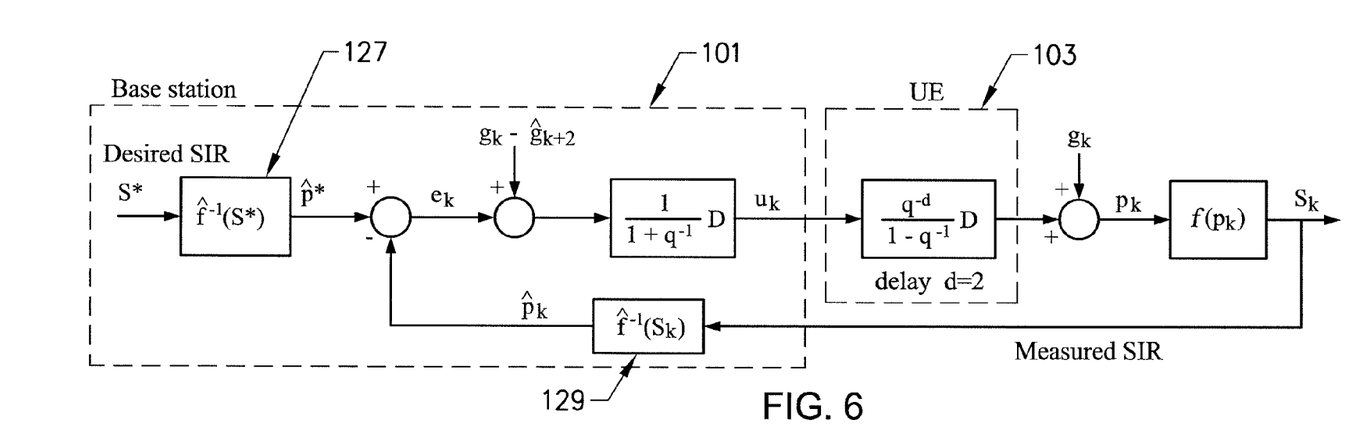
FIGS. 6 and 7 depict two alternative embodiments of a controller using non-linear decoupling.
Figure 7:
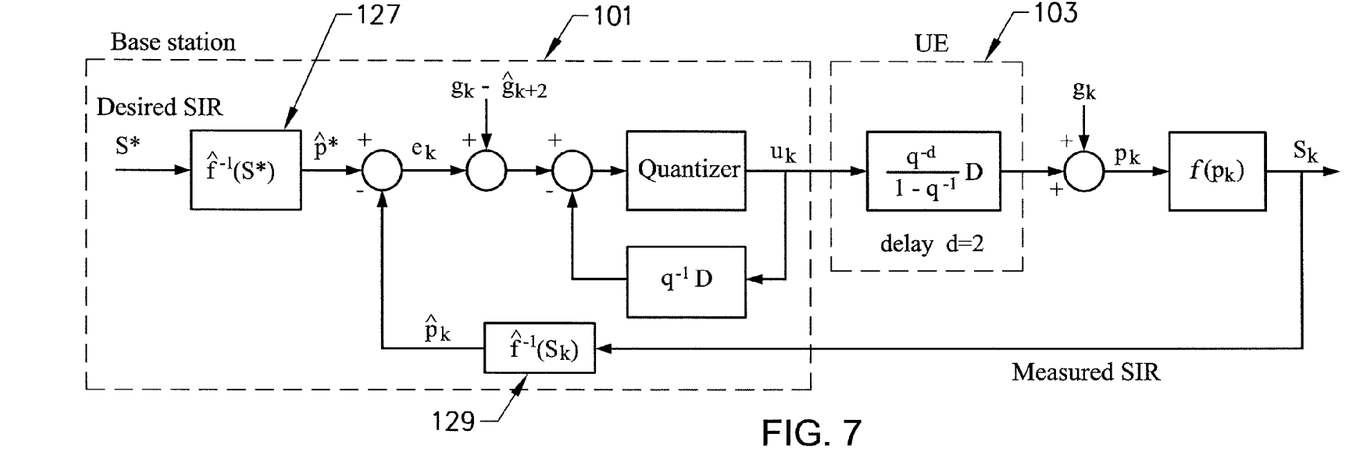

In FIGS. 6 and 7 two alternative embodiments of a controller using the above non-linear decoupling link 127 and 129 to obtain a controller 109 that takes into account the coupling in the uplink are depicted.

Figure 17:
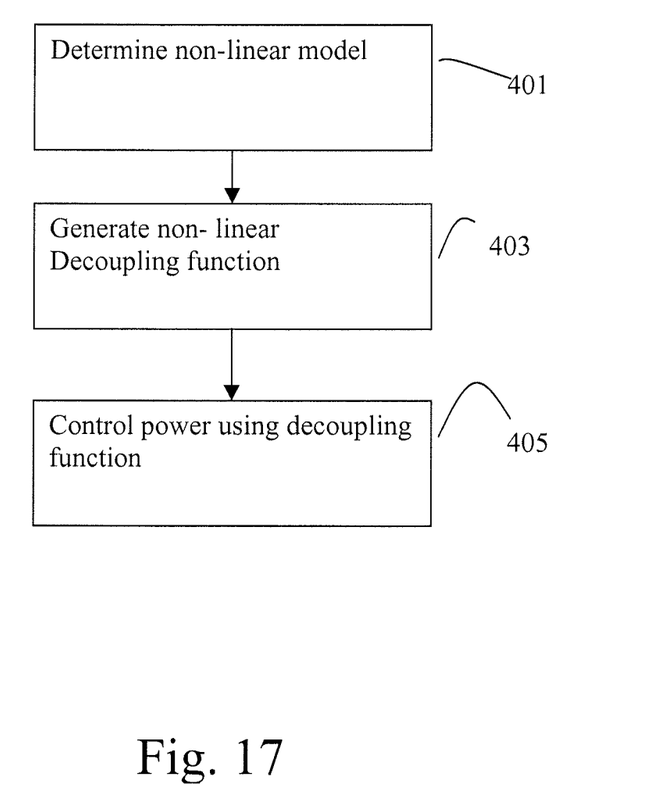
FIG. 17 is a flowchart illustrating some procedural steps performed in a power control module 109 when using a non-linear decoupling function.

In FIG. 17 a flowchart illustrating some procedural steps performed in a power control module 109 when using a non-linear decoupling function is illustrated. First, in a step 401, a nonlinear model for the power coupling caused by the SIR target inner loop is determined. The model can for example be a model as described above. Next, in a step 403, a non-linear decoupling function is formed from the non-linear model. The decoupling function can for example be generated as described above. Thereupon, in a step 405 the decoupling function is used to decouple different users in the (W)CDMA uplink when controlling the power in the inner loop. In one embodiment the power control comprises repeated calculation of the decoupling function in a multiple input–multiple output inner loop power control procedure.

Using a nonlinear decoupling link, to the MIMO inner loop power control problem in CDMA systems, where the reference value is provided by a target SIR, will provide an improved control of the uplink power. This is further illustrated by the below simulation results.

Figure 12:
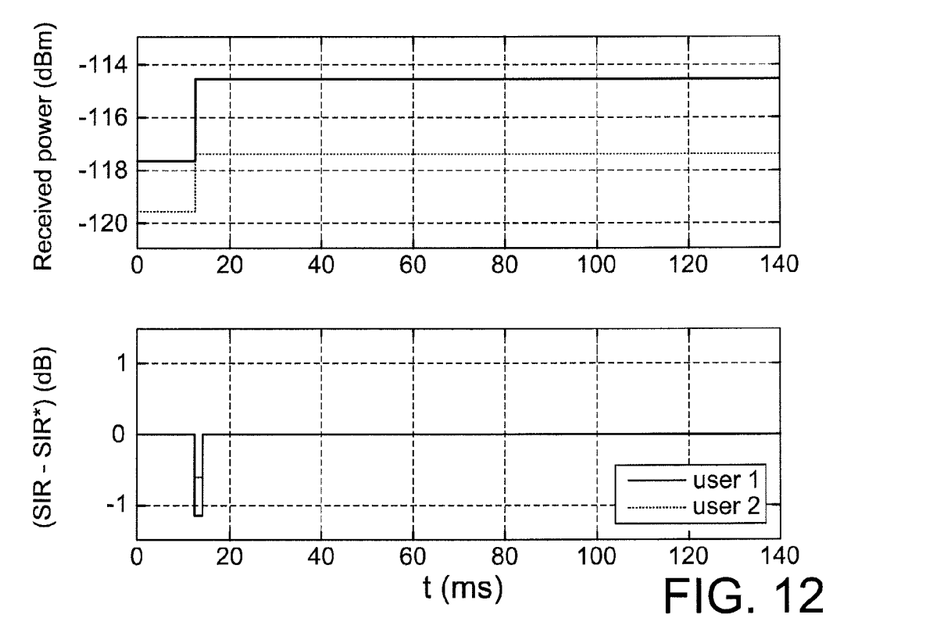
FIG. 12 illustrates convergence of powers and SIRs of a inner loop power control scheme using a linearized decoupling function (quantization effect not shown)

The same setup that generated FIG. 8 was used to simulate the inner loop power control, using the scheme of FIG. 6. The result, which appears in FIG. 12 shows a vastly improved convergence time. Note that no quantization was used in this case.

Figure 13:
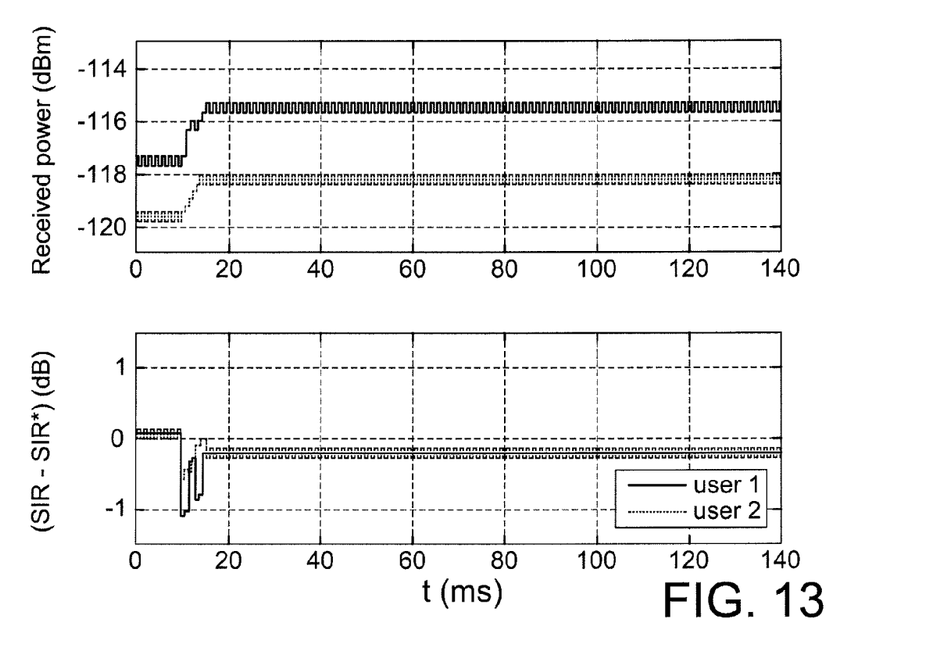
FIG. 13 depicts simulation results using a conventional controller with a 3 bit quantizer (not using decoupling)
Figure 14:
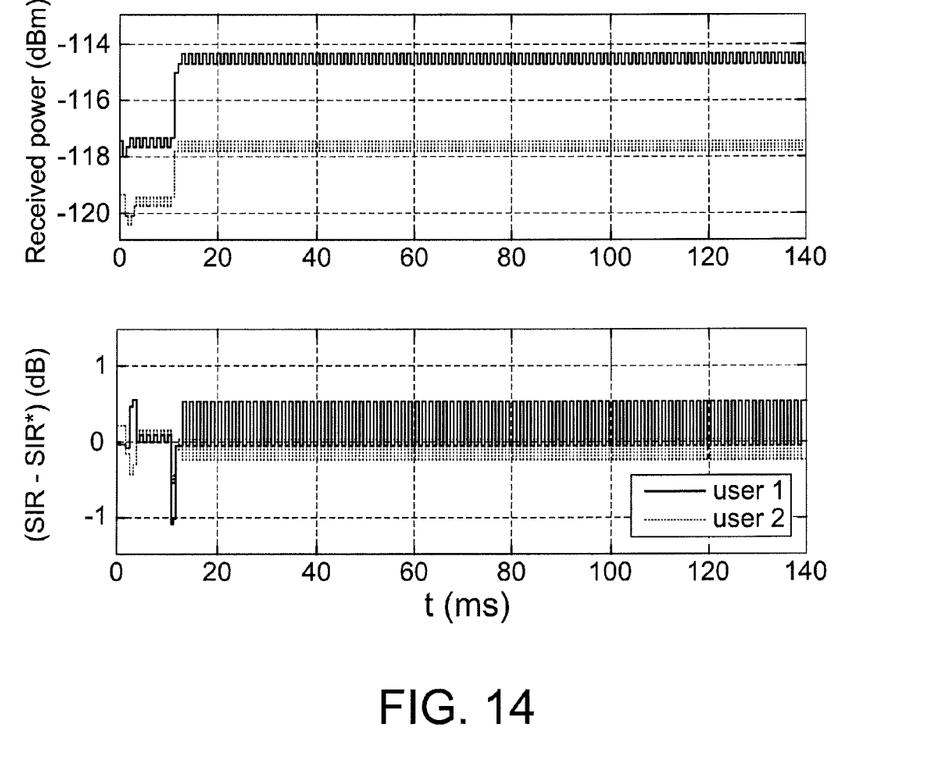
FIG. 14 depicts simulation results using a conventional controller with a 3 bit quantizer using decoupling.

When quantization is added the gains of the invention are reduced. However, substantial gains remain with a 3-bit quantizer, see FIG. 13 and FIG. 14. FIG. 13 depicts simulation results using a conventional controller with a 3 bit quantizer not using decoupling. In contrast the simulation results with a controller with a 3 bit quantizer using non-linearized decoupling is depicted in FIG. 14.

Using the methods and devices for power control in the inner loop of a CDMA system will resulting that the current individual inner power control loops (based on SIR target) operate better—since they are designed without consideration of other users in the uplink. Also, the convergence time to a new setpoint after an interference disturbance becomes significantly reduced, provided that the power command quantization is low enough. Moreover, the SIR based power control principle is retained, something that allows the improvements associated with the invention to be obtained without switching to a completely redesigned scheme based on a power target.

The invention claimed is:

1. A method of controlling power in the inner loop of a code-division multiple-access (CDMA) radio system, the inner loop being associated with a signal-to-interference ratio (SIR) target, the method comprising:

determining a mathematical model for power coupling between power control loops for individual CDMA radio system users caused by the SIR target inner loop, wherein the mathematical model is a linear mathematical model or a non-linear mathematical model;

providing a decoupling function for the power coupling caused by the SIR target inner loop, based on the mathematical model;
repeatedly calculating the decoupling function; and
controlling power in the inner loop using the decoupling function.

2. The method of claim 1, wherein:
determining the mathematical model comprises determining a nonlinear mathematical model for the power coupling caused by the SIR target inner loop and linearizing the determined model around the current operating point;
providing the decoupling function comprises forming a decoupling matrix from said linearized model; and
controlling power in the inner loop comprises using the decoupling matrix to provide decoupling between different users of the CDMA uplink.

3. The method of claim 1, wherein:
determining the mathematical model comprises determining a nonlinear mathematical model for the power coupling caused by the SIR target inner loop;
providing the decoupling function comprises forming a non-linear decoupling function from the non-linear model; and
controlling the power in the inner loop comprises using the non-linear decoupling function to decouple different users in the CDMA uplink.

4. A controller configured to control power in the inner loop of a code-division multiple-access (CDMA) radio system, the inner loop being associated with a signal-to-interference ratio (SIR) target, the controller comprising:
a module arranged to determine a mathematical model for power coupling between power control loops for the individual CDMA radio system users caused by the SIR target inner loop, wherein the mathematical model is a linear mathematical model or a non-linear mathematical model;
a module arranged to provide a decoupling function for the power coupling caused by the SIR target inner loop, based on the mathematical model;
a module arranged to repeatedly calculate the decoupling function; and
a module arranged to control the power in the inner loop using the decoupling function.

5. The controller of claim 3, wherein:
the module arranged to determine the mathematical model is arranged to determine a nonlinear mathematical model for the power coupling caused by the SIR target inner loop control and is arranged to linearize the determined model around the current operating point;
the module arranged to provide the decoupling function is arranged to form a decoupling matrix from said linearized model; and
the module arranged to control power in the inner loop is arranged to use the decoupling matrix to provide decoupling between different users of the CDMA uplink.

6. The controller of claim 3, wherein:
the module arranged to determine the mathematical model is arranged to determine a nonlinear model for the power coupling caused by the SIR target inner loop;
the module arranged to provide the decoupling function is arranged to form a non-linear decoupling function from the non-linear model; and
the module arranged to control power in the inner loop is arranged to use the non-linear decoupling function to decouple different users in the CDMA uplink.

7. A power control module configured to control power in the inner loop of a code-division multiple-access (CDMA) radio system, the inner loop being associated with a signal-to-interference ratio (SIR) target, the power control module comprising a processor and memory circuit configured to:
determine a mathematical model for power coupling between power control loops for individual CDMA radio system users caused by the SIR target inner loop, wherein the mathematical model is a linear mathematical model or a non-linear mathematical model;
provide a decoupling function for the power coupling caused by the SIR target inner loop, based on the mathematical model;
repeatedly calculate the decoupling function; and
control power in the inner loop using the decoupling function.

8. The power control module of claim 7, wherein the processor and memory circuit is configured to:
determine a nonlinear mathematical model for the power coupling caused by the SIR target inner loop;
linearize the determined non-linear mathematical model around the current operating point;
form a decoupling matrix from said linearized mathematical model; and
control power in the inner loop using the decoupling matrix to provide decoupling between different users of the CDMA uplink.

9. The power control module of claim 7, wherein the processor and memory circuit are configured to:
determine a nonlinear mathematical model for the power coupling caused by the SIR target inner loop;
form a non-linear decoupling function from the non-linear mathematical model; and
control the power in the inner loop using the decoupling function to decouple different users in the CDMA uplink.

* * * * *